Dec. 1, 1942. H. A. SMITH Re. 22,229

COIN SELECTOR AND SLUG REJECTER

Original Filed May 8, 1933 5 Sheets-Sheet 1

Inventor:
Harold A. Smith

By: Richardson & Geier
Attys.

Dec. 1, 1942. H. A. SMITH Re. 22,229

COIN SELECTOR AND SLUG REJECTER

Original Filed May 8, 1933 5 Sheets-Sheet 2

Inventor:
Harold A. Smith
By:
Richardson and Geier
Attys.

Dec. 1, 1942. H. A. SMITH Re. 22,229

COIN SELECTOR AND SLUG REJECTER

Original Filed May 8, 1933 5 Sheets-Sheet 3

Inventor:
Harold A. Smith

By: Richardson and Geier
Attys.

Dec. 1, 1942. H. A. SMITH Re. 22,229

COIN SELECTOR AND SLUG REJECTER

Original Filed May 8, 1933 5 Sheets-Sheet 4

Inventor:
Harold A. Smith

By: Richardson and Geier
Attys.

Dec. 1, 1942. H. A. SMITH Re. 22,229

COIN SELECTOR AND SLUG REJECTER

Original Filed May 8, 1933 5 Sheets-Sheet 5

Inventor:
Harold A. Smith
By: Richardson & Geier
Attys.

Reissued Dec. 1, 1942 Re. 22,229

UNITED STATES PATENT OFFICE 22,229

COIN SELECTOR AND SLUG REJECTER

Harold A. Smith, Delavan, Wis.

Original No. 2,041,785, dated May 26, 1936, Serial No. 669,899, May 8, 1933. Application for reissue July 9, 1942, Serial No. 450,321

21 Claims. (Cl. 194—97)

My invention relates to a coin selector and slug rejecter, and means to prevent fraud by using a slug in place of a coin to operate any machine. I have illustrated primarily the coin selector and slug rejecter without showing its direct application to a coin operated machine. However, it will be apparent from this and other descriptive matter herein, that my coin selector and slug rejecter may be associated in any desirable manner with such machines or devices where it is necessary to use a coin to operate the same. The slug rejecting mechanism of my device is of a simple character and is adapted to be operated to reject a slug and prevent it from being used to operate coin controlled devices. The rejecting mechanism may operate to reject the slug before it enters the coin controlled mechanism which operates the device.

A feature resides in providing a simple means for preventing any kind of a slug from being used to operate a coin controlled apparatus, whether it be a telephone or a machine where a coin slot is provided. Further, my selector and rejecter may be associated with any coin operated mechanism for dispensing goods or articles sold through a coin operated machine.

Heretofore, slugs of various characters have been used to operate coin controlled devices, thereby fraudulently obtaining goods or service through the use of such slugs. These slugs have been made to closely imitate the coin of the denomination required and it has been almost impossible to stop the use of the same. Some of these slugs are formed with a hole therein, while others are of a disk-like nature, either having smooth faces or formed with printing or other fanciful configurations on the faces thereof. These last slugs which have certain representations on the faces thereof, are made to simulate a coin or to indicate that the slug is of a certain value in merchandise or the like, but all of these slugs are made of the proper diameter to represent a particular coin of a certain denomination, so as to imitate the same as closely as possible. These slugs are often made of approximately the same weight as the coin that they are designed to imitate, thus making it even more difficult to detect them and cause the same to be rejected before they manipulate the coin controlled device.

A feature of my invention resides in providing a coin selector and slug rejecter which is capable in the one device of detecting and rejecting a slug, whether it be smooth-faced or formed to imitate a coin, or even if the slug is formed with a hole therein, and also to select the proper coin in a manner to retain the same while the slugs in virtually any form are rejected. Therefore, I have provided a means with a wide range of utility in accomplishing results which I believe have not been possible heretofore in a single unitary selector and rejecter. While devices have been made to prevent the use of slugs, they have failed in not having sufficient range to prevent the use of almost any type of slug. With such old devices, it was only necessary for the operator to carry a variety of slugs and if one would not work, another one would probably do so. With my device, the operator is not able to use these different slugs, for any slugs will be detected and rejected so they are worthless, and the proprietor of a coin operated device is thereby protected in the use of the same.

These features and other details will be more fully and clearly set forth throughout the specification and claims.

In the drawings forming part of this specification:

Figure 1:
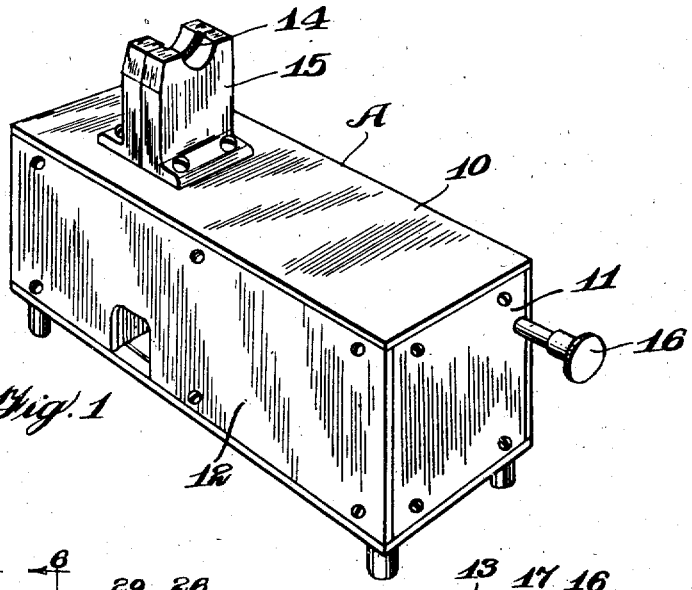
Figure 1 illustrates a perspective view of a form of my coin selector and slug rejecter.
Figure 2:
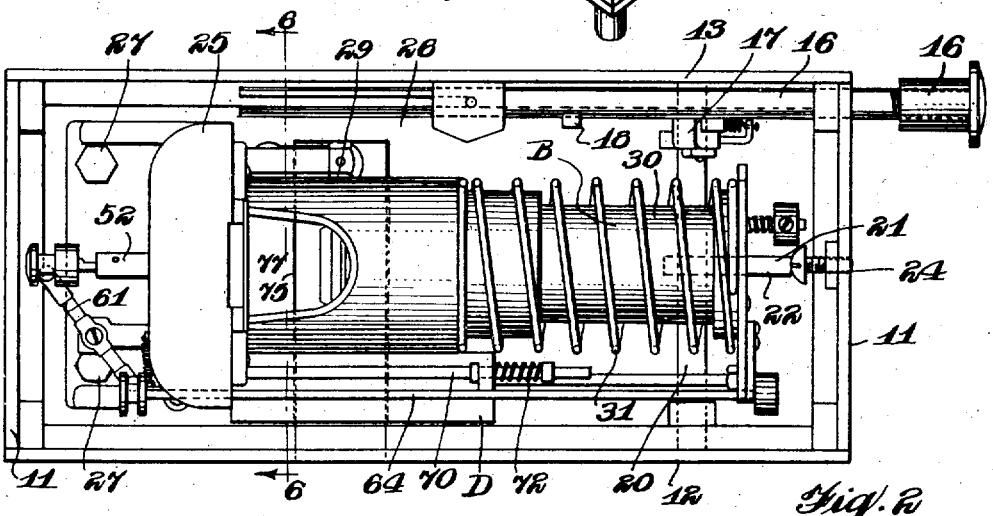
Figure 2 is an enlarged plan view of the same with the cover thereof removed.

My coin selector and slug rejecter A is illustrated as a unitary device contained within a suitable casing which is provided with a top 10, end walls 11 and side walls 12 and 13. The cover 10 is provided with a coin receiving groove 14 formed in the coin tube 15.

Figure 17:
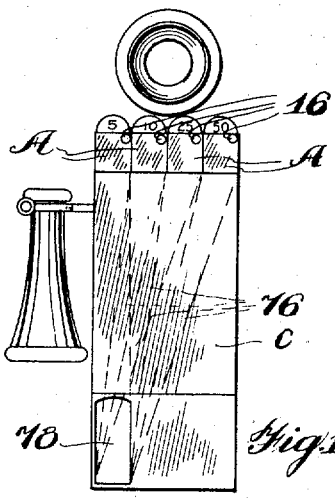
Figure 17 illustrates a toll telephone box, showing my coin selector and slug rejecter attached thereto for each money denomination.

The drawings illustrate the coin selector and slug rejecter A as a unit of itself and not attached to a coin operated device, because it will be apparent that the same may be attached in any suitable manner to fit various different coin operated devices, so as to be of the proper size and dimensions to operate therewith. There are a large variety of these devices and owing to the fact that it would not be practical to show them all, I have simply shown my coin selector and slug rejecter in its various forms and in larger detail, so as to more clearly illustrate the operation of the same and to permit the parts to be more readily described. I have, however, shown one application of my coin selector and slug rejecter to an ordinary toll telephone box, as illustrated in Figure 17.

Figure 3:
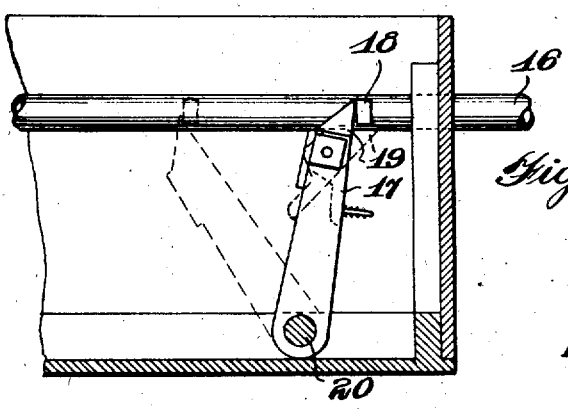
Figure 3 is an enlarged detail of a portion thereof.
Figure 4:
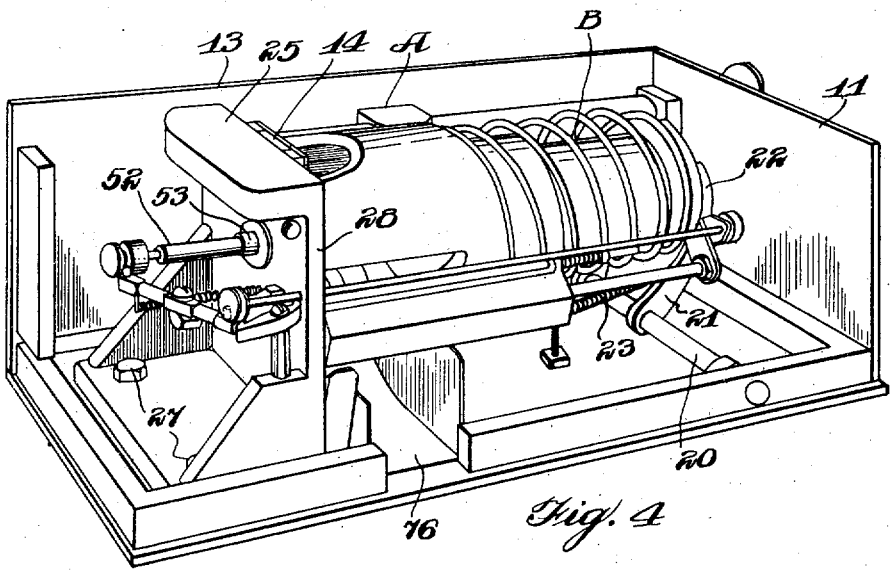
Figure 4 is an enlarged perspective side view of my coin selector and slug rejecter, with a part of the walls thereof removed to show the inner mechanism.

The detector A is provided with an operating handle 16 which operates the trip 17 to push the same forward into the dotted line position illustrated in Figure 3 and when the operating lever 16 reaches this inward position, the trip 17 is automatically released and permitted to be forced back into its original position. The operating lever 16 can be then pulled out into position to be reoperated. As the rod 16 is pulled out, the shoulder 18 which operates the trip 17 ratchets over the spring dog 19 of the trip 17.

The trip lever 17 is mounted upon a transverse shaft 20 and is adapted to operate the same each time the hand lever 16 is forced inward. A lever 21 is mounted on the shaft 20 and is formed with a curved operating end 22 which engages the end of the vacuum cylinder B. A spring 23 holds the end 22 in engagement with the cylinder B. The backward movement of the lever 21 is adjusted by the set screw 24 carried in the end 11.

Figure 7:
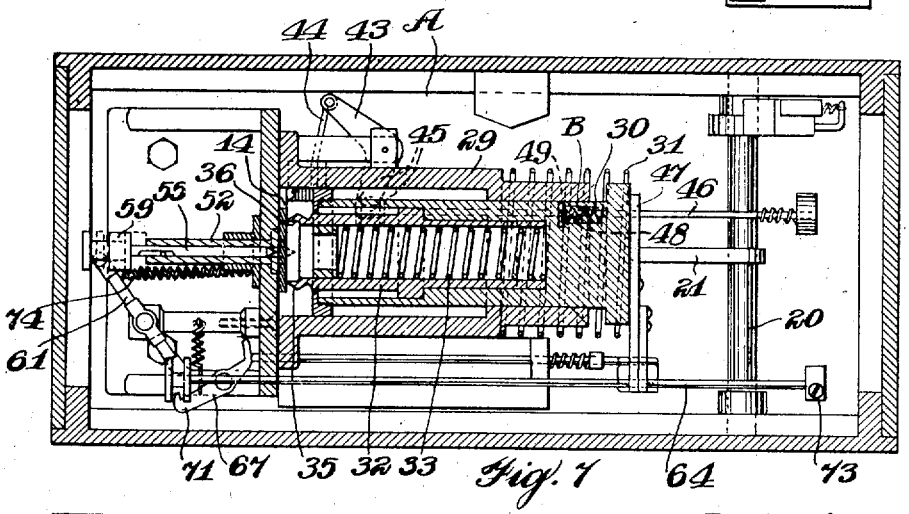
Figure 7 is a similar section to Figure 5, showing the parts in another position.

The vacuum cylinder B is supported by the bracket 25 which is secured to the bottom 26 by the screws 27. This frame is formed with a vertically extending wall portion 28 upon which the base portion 29 of the vacuum cylinder is mounted to hold the same extending longitudinally in the casing of the selector A. The slidable portion 30 of the vacuum cylinder is normally held in extended position by the coil spring 31 which extends about the same, and when the lever 16 is operated causing the lever 21 to compress the portion 30 into the base portion 29, a vacuum is built up in the cylinder which becomes effective for the purpose which will be hereinafter set forth, at the moment that the lever 17 trips off of the lug 18. This operation is of primary importance in carrying out some of the principles of my selector. Within the vacuum cylinder B, I provide a plunger 32 which is slidably supported in the vacuum cylinder and is normally caused to be held in projected position by the inner coil spring 33 which engages in one end of the cylinder 30 and against the shoulder of the collar 34 in the end of the plunger 32. This plunger 32 is provided with a sharp working face 35 which is adapted to engage against the coin or slug in the operation of the selector A, as illustrated in Figure 7. In this figure, the coin 36 is in position to be engaged by the sharp working edge 35 of the plunger of the vacuum cylinder B and the plunger is shown compressed within the vacuum cylinder while the vacuum cylinder is compressed within the base portion 29. The parts as illustrated herein Figure 7, show the same just prior to the moment of release of the lever 17 and before the vacuum cylinder B automatically is expanded by the spring 31.

Figure 10:
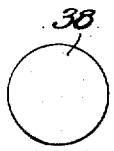
Figure 10 illustrates a slug with smooth outer faces.
Figure 9:
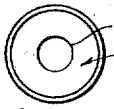
Figure 9 illustrates a slug having a hole therein.
Figure 11:
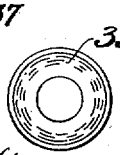
Figure 11 illustrates a slug which is formed with surfaces to simulate a coin and indicating a denomination thereon.

I have illustrated in Figure 9, a slug 37 which is formed with an outer annular bead around the faces thereof and a central opening 37'. In Figure 10, I have illustrated a slug 38 which is formed with smooth outer faces. In Figure 11, I have illustrated a slug 39 which is formed with an annular bead around the same, similar to a coin and also formed with printed matter thereon to simulate a coin, as well as to be provided with a numeral indicating the denomination thereof, such as "5¢." These figures illustrate some of the slugs that are commonly used to fraudulently operate coin operated devices.

Figure 6:
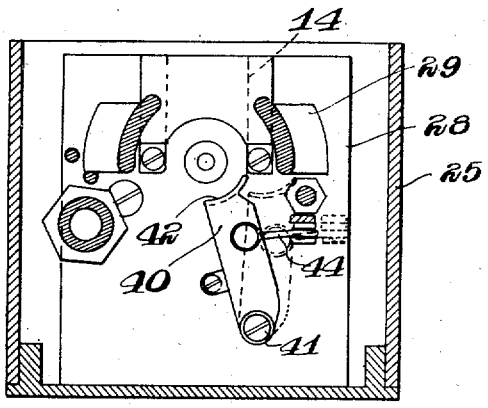
Figure 6 is an enlarged sectional detail on the line 6—6 of Figure 2, without showing the outer casing.

The coin groove is formed to lead down to a position in axial alignment with the vacuum cylinder B. I provide a gate arm 40 which is pivotally secured at 41 to the wall 28 of the bracket 25, as illustrated in Figure 6. The arm 40 normally is held in the full line position illustrated so that the arcuated edge 42 will form a shoulder against which the coin 36 or any of the slugs 37, 38 or 39 will rest when they have been inserted into the coin groove 14. The gate 40 remains in the full line position until it is automatically tripped, whereupon it moves into the dotted line position. The tripping of the gate arm 40 takes place just prior to the tripping of the vacuum cylinder B and after the working edge 35 has engaged the coin or the slug.

The gate 40 is adapted to be tripped by the bell crank lever 43 which is pivotally secured at 43' to a bracket supporting member extending forward from the wall 28 of the support 25. This bell crank operates the rod 44 in a manner to pull the gate into the dotted position illustrated in Figure 6. The bell crank lever is engaged on one end between the shoulders 45. The shoulders 45 are carried by the inner end of the rod 46 which extends along below one side of the vacuum cylinder B. The inner end of the rod 46 is slidably supported to the under part of the base 29 of the cylinder B, while the front end of the rod 46 is slidably supported in the plate 47 which is mounted on the end of the cylinder B. The plate 47 engages with the coil spring 48 which in turn engages the collar 49 on the rod 46, as the cylinder B is compressed inward, causing the rod 46 to move the gate 40 into inoperative position after the working face 35 has engaged the coin or the slug. As the vacuum cylinder B is released and caused to expand, the plate 47 engages against a coil spring 50 which is supported on the outer end of the rod 46 and is held thereon by the shoulder collar 51 adjustably secured to the end of the rod 46. Thus, as the cylinder B is expanded, the shoulders 45 will pull the bell crank 43 back into the position illustrated in Figure 5, which will cause the rod 44 to push the gate arm 40 back into the full line position illustrated in Figure 6, forming a shoulder for a coin or a slug to hold the same in position to be tested as to its character.

I provide a means of detecting and rejecting a slug with a hole in it, which includes a hollow plunger 52 which is slidably supported in the bracket sleeve 53 which is secured on the back of the wall 28. The plunger 52 is formed with a washer-like end 54 which is normally positioned counter-sunk in the wall 28 and positioned centrally in line with the coin groove 14 so that the washer-like end 54 is concentric with the working plunger 32 and the cylinder B, as well as being concentrically positioned to the working edge 35 of the plunger 32.

Figure 5:
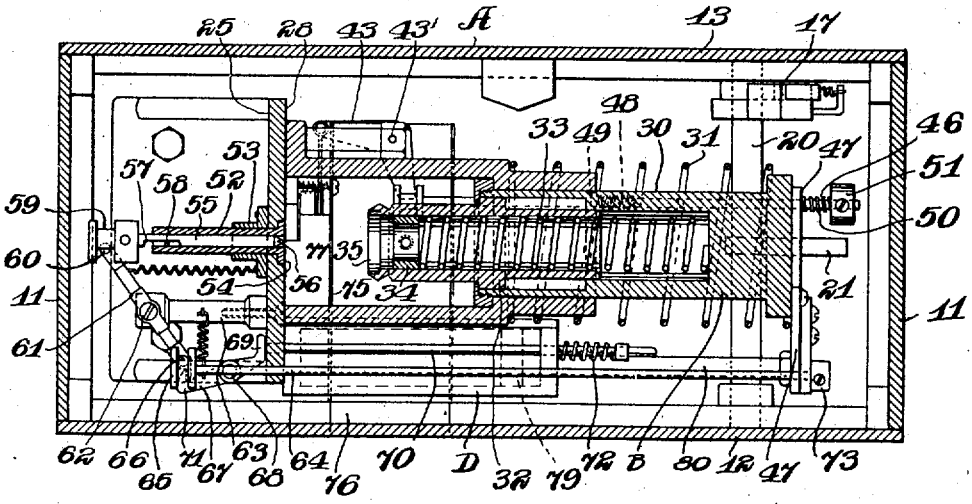
Figure 5 is an enlarged central longitudinal section through the coin selector and slug rejecter.

A rod 55 is slidably positioned within the hollow plunger 52 and is formed with a pointed end 56 which is normally positioned within the washer-like end 54 of the plunger 52, as illustrated in Figure 5. The rod 55 is slotted at 57 and works over a key pin 58 to limit the sliding movement of the rod 55. An adjustable yoke head 59 is secured to the outer end of the rod 55 and is adapted to be engaged by the pin 60 which is positioned on one end of an operating lever 61, which controls the operation of the plunger 52 and the rod 55. The lever 61 is pivoted at 62 to the supporting bracket 63 which is mounted on the back of the wall 28 to hold the lever in operative position. The lever 61 is adapted to be operated by the rod 64 which slidably extends through the wall 28 and which is formed with a yoke end 65 which pivotally and slidably engages the pin 66 on the end of the lever 61. However, the end of the lever 61 which carries the pin 66 is normally held by the spring catch 67 in inoperative locked position, so that the lever 61 will not ordinarily operate unless this spring catch 67 is first released. The spring catch 67 is pivotally mounted at 68 and is formed with a shoe end 69 which is adapted to be engaged by the rod 70 when the rod 70 is operated. The other end of the spring catch 67 is formed with a hook 71 which engages the extreme end of the lever 61. The rod 70 is normally held in the position illustrated in Figure 5 by the coil spring 72 out of engagement with the end 69 of the catch 67. Then when the cylinder B is compressed, the plate 47 will engage against the end of the rod 70 compressing the spring 72 and causing the catch 67 to be released from the end of the lever 61.

Figure 8:
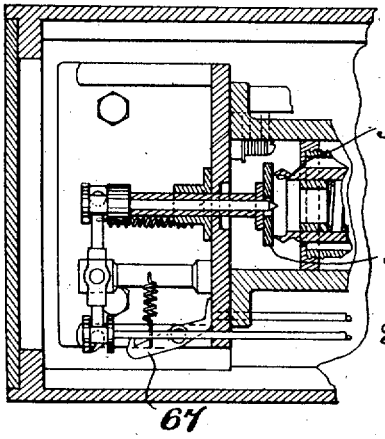
Figure 8 is a detail section similar to Figure 7, showing the parts in still another position.

One end of the rod 64 is slidably mounted in the plate 47 and an adjustable collar 73 causes the rod to be operated when the cacuum cylinder B is expanded, causing the yoke 65 to pull on the pin 66 and reset the lever 61 into locked position held by the catch 67. A coil spring 74 is secured to the end of the lever 61 and acts to force the plunger 52 with the rod 55 into the open end of the plunger 32 when the catch 67 is released and the vacuum cylinder B is compressed far enough to release the collar from the plate 47, as illustrated in Figure 7, so as to permit the lever 61 to push the plunger 52 inward. This permits my selector to operate to engage a slug such as 37 with a hole in it, as illustrated in Figure 8, permitting the pointed end of the rod 55 to engage through the hole of the slug to support the same on the rod and permit the washer end 54 to automatically push the slug toward the working end 35 as the same recedes back into the position illustrated in Figure 5, thus automatically and virtually instantly kicking the slug over the dividing wall 75. The wall 75 projects up from the bottom of the selector A and forms one side of the slug ejecting chute 76. The slug ejecting plunger 52 is pulled back quickly into its normal position by the rod 64 when the collar 73 is engaged by the backward movement of the plate 47 in the expansion of the vacuum cylinder B. This operation causes the slug to drop into the chute 76, ejecting the same out of the selector A.

If a slug such as 38 or 39 is inserted in the coin slot 14 and the selector is operated by pushing the handle 16 inward to compress the vacuum cylinder B, the working surface 35 of the plunger 32 will engage the smooth portion of the slug, sealing the end of the plunger 32 on the slug, and as the cylinder B is released by the trip 17 and caused to be expanded by the spring 31, the vacuum in the cylinder B and in the hollow plunger 32 will be sufficient to hold the slug long enough to carry it over the division wall 75 and drop it into the chute 76. Thus, the vacuum created in the cylinder B is sufficient to carry a non-perforated slug over the dividing wall 75 and drop the slug into the ejecting chute. The working surface 35 is sharp enough to fit the surface of the non-perforated slug and the vacuum built up in the cylinder operates to carry a slug of this character into ejecting position. The ejecting mechanism including the plunger 52 and the rod 55 is inoperative when slugs of this character without a hole are ejected by the selector A, because this mechanism is not needed to assist in the ejection of the slug, owing to the fact that the vacuum pulls the slug out of the coin slot fast enough to keep it from falling straight down through the coin slot and into the chute 77, which is directly below the end of the coin slot 14. The ejecting plunger 52 with its piercing rod 55 remains dormant even though the catch 67 is released when operating against a closed slug or against a coin such as 36, and before the plunger 52 has time to be operated by the spring 74, the vacuum cylinder B has returned to normal position and the collar 73 has been engaged by the plate 47 to prevent the lever 61 from operating. A slight movement of the cylinder B is sufficient to operate the catch 67. When the rod 55 is actuated due to a hole in the slug, however, the lever 61 has been moved out of latching position by the spring 74. This is important in the operation of this mechanism of my selector A because if this were not true the plunger 52 might push a coin over into the ejecting chute 76.

When a coin is dropped into the slot 14, it will be engaged by the gate arm 40 and held in this selecting position until the lever 16 is operated, causing the working end 35 of the plunger 32 to engage the surface of the same. The fact that the coin has an irregular surface like a buffalo nickel, prevents the vacuum from being built up in the cylinder B to a sufficient extent to draw the coin over the division wall 75. Thus, after the cylinder B is released, the coin 36 will drop straight down into the coin chute 77 and out of the bottom of the selector A into position to operate a coin controlled device or to ring the bell in a telephone box C.

The selector units A may form a part of the coin box C of a toll telephone, as illustrated in Figure 17, there being an individual selector for each denomination such as "5¢," "10¢," etc., if it is desired. It is also apparent even though it is not illustrated herein, that a separate selector plunger 32 may be provided for each denomination of coin in the telephone box C with a single operating lever such as 16 and a single vacuum cylinder B, which may be connected in a suitable manner to operate singularly with the vacuum directed to the coin slot wherein the coin is dropped. The slug ejecting chute 76 may be connected to the coin return chute 78 of the coin box C so that should an operator place a slug in any of the respective slots for the coins in the box C, and the lever 16 is operated to release the same into the coin box, the slug will be immediately returned into the coin return chute 78.

The vacuum cylinder B is connected with an air check cylinder D positioned on one side of the same and supported on the wall 28, in which the plunger 79 operates through the rod 80 which connects with the plunger and the plate 47, so as to check or cushion the expanding movement of the cylinder B.

Figure 12:
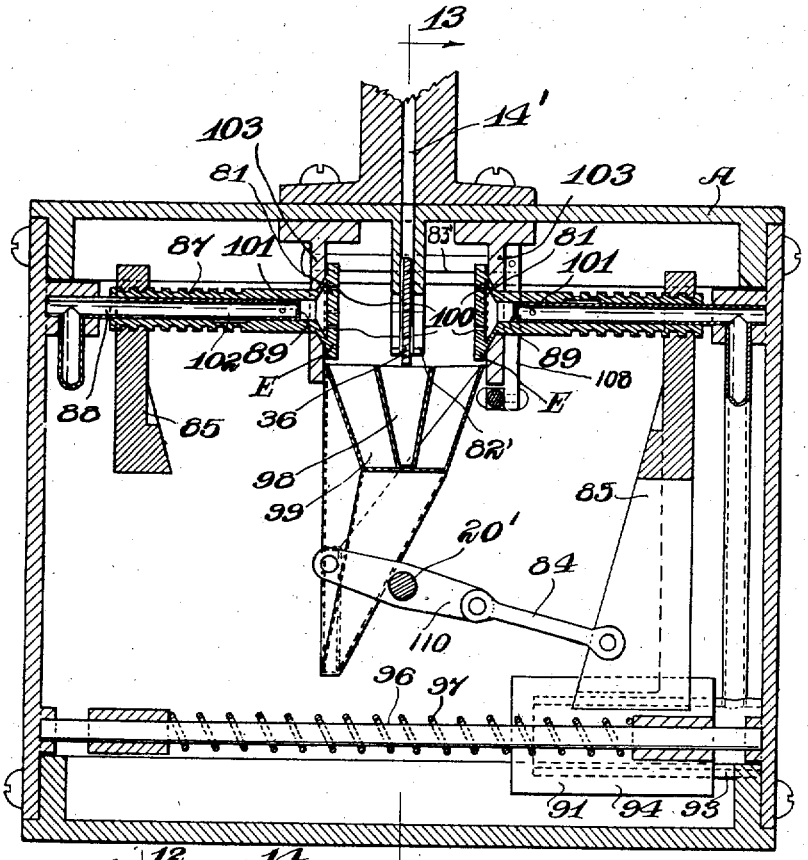
Figure 12 is an enlarged section through the body of another form of my coin selector and slug rejecter, (said section being approximately on the line 12—12 of Figure 13).
Figure 13:
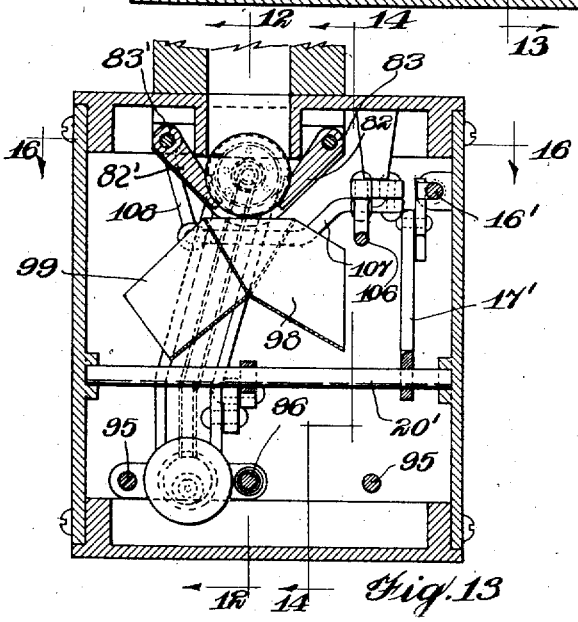
Figure 13 is a section on the line 13—13 of Figure 12.

My selector A may be made in the form illustrated in Figures 12 to 16, respectively, wherein the coin selectors E may be provided with die faces 81 which are formed with virtually the identical die formation to fit the particular coin that is adapted to be used in the coin slot 14'. The formation of the die faces 81 is more fully illustrated in Figure 18 which shows the design of the die to be used in the selectors E where they are designed to select a buffalo nickel. The selectors E are normally spaced apart as illustrated in Figure 12, on each side of the coin slot 14'. When the coin or buffalo nickel 36 is dropped into the slot 14', it is adapted to be stopped by the gate levers 82 and 82'. The levers 82 and 82' are rigidly mounted on the rotatable shafts 83 and 83' and hold the coin in selecting position. If a slug is dropped into the slot 14', it will be held by the levers 82 and 82' in the same manner. In this form of the coin selector A, a hand or power operating rod 16' is also employed which operates the tripping lever 17'. The lever 17' is keyed to the shaft 20' which extends between the sides of the casing, as illustrated in Figure 13. This shaft 20' operates to control the setting of the selectors E so as to bring them simultaneously into contact with both sides of the coin 36 or a slug dropped into position to be selected.

A yoke lever 110 is connected to the shaft 20' and extends virtually equally on either side thereof and is connected by the links 84 to the brackets 85 which are positioned in staggered relation within the casing of the selector and rejecter A. The upper ends 86 of the brackets are threaded to the sleeves 87 with a comparatively steep pitched thread, so that the sleeves 87 may be rotated by the movement of the brackets 85 after the brackets 85 have reached a predetermined point. The sleeves 87 are rotatably mounted upon the hollow shafts 88, the inner end of the shafts 88 being closed at 89. The hollow shafts 88 are connected by the tubes 90 to the respective vacuum cylinders 91, there being a separate vacuum cylinder 91 for each tube 90 and shaft 88.

Figure 14:
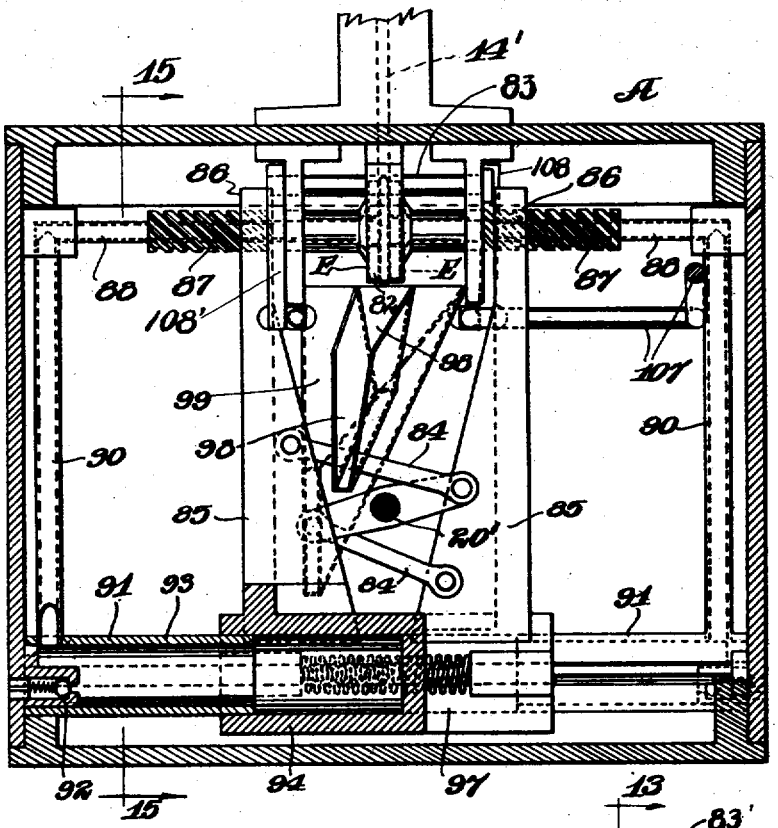
Figure 14 is an enlarged section on the line 14—14 of Figure 13.
Figure 15:
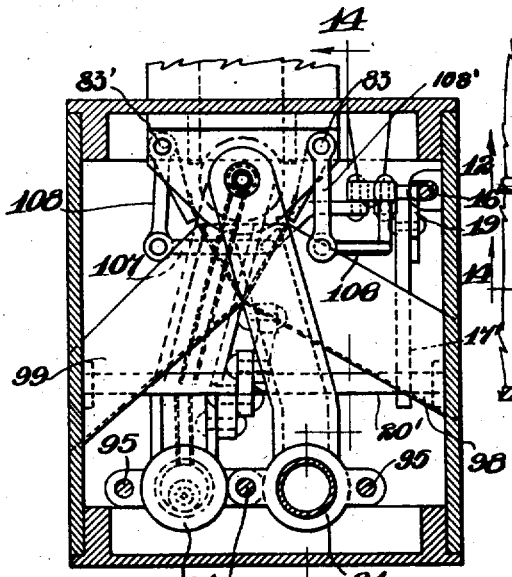
Figure 15 is a section on the line 15—15 of Figure 14.

The vacuum cylinders 91 are constructed as illustrated in Figure 14 which shows a section through one of the cylinders, wherein an air check valve 92 is positioned in one end of the sleeve 93 of the cylinder. The sleeve 93 is fixed to the side wall of the selector A, whereas the sliding cylinder portion 94 of the vacuum cylinder is carried by the lower end of the arm 85. Figure 14 shows the cylinders 91 expanded and at the height of their vacuum, whereas Figure 12 shows one of the cylinders 91 telescoped with the portion 94 slid virtually over the sleeve 93. The staggered relation of the vacuum cylinders 91 is illustrated in Figure 15. Guide rods 95 guide the cylinder portions 94 which form the lower ends of the brackets 85 on the outside of the cylinders 91, whereas a common guide rod 96 is positioned between the same and a coil spring 97 carried on the rod 96 acts to normally force the cylinders 91 into telescoped position, as illustrated in Figure 12. In moving into this position, the check valve 92 exhausts the air from the cylinders.

The selector A in this form is provided with a slug chute 98 which is positioned directly below the selecting position for the coin or slug, as illustrated in Figure 12, so that when the gate levers 82 and 82' are moved apart, if one of the selectors E has not removed the member or element dropped into the position between the gate levers 82 and 82', it will drop directly into the slug-ejecting chute 98. The slug-ejecting chute projects out to one side of the selector A so as to discharge the slug out of the selector when it drops into the chute 98. I provide a coin-receiving chute 99 which projects on either side of the top end of the slug chute 98, but which extends out in the opposite direction and is adapted to carry a coin dropped into the same, out on the opposite side of the selector A and to deposit the coin in any suitable receptacle or in position to operate a coin-controlled device.

Figure 18:
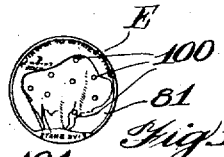
Figure 18 illustrates the die face in one form of my coin selector and slug rejecter, illustrating a die formed to fit the buffalo of a buffalo nickel.
Figure 16:
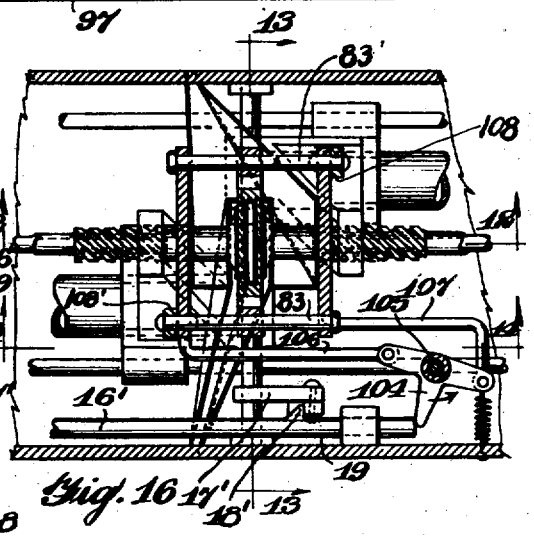
Figure 16 is a section on the line 16—16 of Figure 13.

Thus, when the selectors E are brought up into contact with the faces of the member dropped into the coin slot 14 and held in the position illustrated in Figure 16, if one of the selectors E fits either face thereof, such as the buffalo of a nickel like the design illustrated in Figure 18, the selector fitting the same should act to draw the coin to one side or the other of the slug chute 98. If neither of the selectors E select the element from the selecting position, it is a slug and it will be left to fall straight into the slug chute 98 and be thus ejected.

The faces of the selectors E which are formed with a die to fit the particular coin which the dies are adapted to select are formed with a series of perforations 100 to permit the vacuum set up in the cylinders 91 to operate through the connecting pipes 90 and the hollow shafts 88, to draw a coin properly fitting into the selector E by vacuum to one side of the chute 98, so that the coin may be dropped into the coin chute 99 when the vacuum ceases. Each of the hollow shafts 88 is provided with a hole 101 which is adapted to align with a slot 102 formed along the inside of the sleeve 87, only after the selectors E are brought together, as illustrated in Figure 14, fitting against either side of a coin or slug. Thus, a vacuum in the hollow shaft 88 becomes effective through the openings 100 on the coin fitting in the die face 81 to hold the same while the selector E moves back into the position illustrated in Figure 12, whereupon the vacuum is broken or has subsided to drop the coin 36 into the chute 99.

Figure 19:
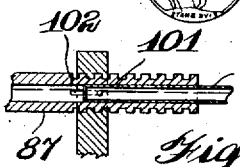
Figure 19 is an enlarged sectional detail of a portion of the form of selector illustrated in Figure 12.

In operation, when the power lever 16' is operated to rotate the shaft 20', the yoke 110 will draw the links 84 around the shaft 20' sufficiently to pull the brackets 85 toward each other, bringing the selectors E against the respective sides of the coin 36. After the selectors E have come in contact with the faces of the coin 36 and the shaft 20′ is further rotated, the threaded connection between the ends 86 and the threaded sleeves 87 will cause the sleeves 87 to begin to rotate, thereby rotating the selector heads E and rotating the die faces 81 on the coin 36 in opposite directions. As soon as either of these die faces fits the coin, the coin will be rotated with the same, until the ends 86 of the brackets 85 have moved towards each other the limit of travel in the operation of the shaft 20′. The threaded engagement between the ends 86 and the threaded sleeves 87 is sufficient to rotate the die faces 81 of the selector heads E a complete rotation, thereby always insuring fitting the face of the coin, no matter how the coin is dropped into the slot 14′. The rotation of the sleeves 87 also brings the slots 102 into alignment with the holes 101 and since the slots 102 overlap the ends of the hollow shafts 88 at this time, as shown in Fig. 19, communication between the vacuum cylinders 91 and the selector heads E is established. Thus, as only one side of the coin may fit the die faces 81 at a time, one of the selector heads E will draw the coin by vacuum to one side of the chute 98 when the selector heads E are tripped and moved apart. When the rotation of the shaft 20′ stops by the tripping lever 17′ disengaging from the operating power lever 16′, the spring 97 then operates to separate the selector heads E and causes the rotation of the sleeves 87 and the heads E after they have moved back against the supporting brackets 103.

In the operation of the selector heads E, the gate levers 82 and 82′ are released from holding the coin 36 or the slug, after the selector heads E engage the same. It is also apparent that the heads E hold the coin or the slug between the same until the selector heads are separated by the tripping lever 17′. With this construction of the selector A, where the die faces 81 are of a true formation to fit the coin, such as a buffalo nickel, a dime, a twenty-five cent piece, a fifty cent piece or a dollar, or any other suitable coin, or member adapted to be used as a coin having a particular die face, it is apparent that only when the proper coin or member is used to fit the die, is it possible to deposit the same into the coin chute 99. If a slug like 37, 38 or 39, or any other similar slug which does not have the proper configuration on one side thereof to fit the die face 81 is endeavored to be used in this form of the selector A, it will not be picked up by the vacuum in one of the selector heads E, and thus it will be dropped the moment that the selector heads separate, falling directly into the slug-ejecting chute 98 which rejects the slug out of the selector A.

The gate levers 82 and 82′ are operated by means of levers 108 and 108′ which are mounted on shafts 83′ and 83, respectively, as shown in Figs. 13 and 15. The operating means also includes a lever 104 which is pivoted at 105 so as to be rotated in the direction of the arrow, Fig. 16, when engaged by the power rod 16′ near the end of its stroke. When the lever 104 is rotated in this manner, the connecting link 106 which extends between lever 104 and lever 108′ is effective to rotate shaft 83 and move the gate lever 82 to open position. At the same time the link 107 moves in the opposite direction and through its connection to lever 108 the shaft 83′ is rotated to move the other gate lever 82′ to open position. A suitable spring means holds the lever 104 normally in the position illustrated in Fig. 16 and thus keeps the gate levers normally in closed position. As the power rod 16′ is pushed against the lever 104 it opens the gate levers just prior to releasing the tripping lever 17′. The mechanism operates quickly when it is tripped and a selection or rejection is made of the coin or slug which has been deposited in the selector A.

The coin selector and slug ejector A in this last form is positive in operation and will operate to absolutely prevent the use of a slug in place of a predetermined coin, where the die face 81 is made of the same formation as the face of the coin. Thus, the efficiency of my selector and slug rejecter will be readily apparent, wherein it is possible for me to provide a perfect coin selector and slug rejecter, thereby providing a means of protecting coin-operated devices with my selector. The facsimile die face of the predetermined coin to be selected is an important feature of my invention and insures a perfect operation in selecting the coin, as well as a perfect operation in rejecting a slug. The only way that a slug could beat my selector would be to have the same formed with a face configuration identical with that of the coin to be selected. It will also be apparent that my selector is very efficient in its operation, owing to the fact that no matter which way the coin is inserted in the coin slot 14′, either one or the other of the selector heads E will pick it up and carry it into the coin chute 99, retaining the same to operate the coin-operated mechanism with which my selector is associated.

It is also apparent that the drawings are only illustrative to describe a mechanism of the character set forth and to illustrate a means of carrying out the principles thereof, and it is obvious that the selector can be made just as small as desired and with the parts arranged in any suitable manner to carry out these principles of selecting a coin and rejecting any slug of any nature whatsoever, thereby preventing fraud in the use of slugs.

I claim:

1. In a coin selector, means for selecting a predetermined coin, including a die having a configuration to fit the predetermined coin, vacuum means for holding the coin in said die to select the same and retain it in the selector, and means for rejecting an imitation coin which does not fit said configuration to automatically discharge the same out of said selector.

2. A coin selector and slug rejecter comprising means for receiving a coin or slug into selecting position, means for supporting the coin or slug in selecting position, vacuum means adapted to engage the coin and draw it into selected position to retain it, and means for releasing said supporting means, whereby a slug in selecting position will be automatically rejected when said vacuum means fails to select the same by reason of it being a slug, thereby causing the slug to automatically drop out of said selector.

3. A coin selector and slug rejecter comprising means for receiving a predetermined coin and holding it in selecting position, said holding means also acting to support a slug in a similar position, die means adapted to engage the face of the coin or the slug, means for changing the relative rotative position of the coin or slug and the die, said die having the formation of the predetermined coin and adapted to fit the same automatically upon being moved into proper position against the coin, vacuum means acting to remove the proper coin from said selecting position, said die and vacuum means being ineffective on a slug, and means for releasing said holding means subsequent to the actuation of said vacuum means to reject the slug out of said selector.

4. A coin selector including means for receiving a predetermined coin adapted to hold the same in selecting position, die means having a configuration conforming to the surface of the said predetermined coin for selecting the same to retain it in said selector, and means in said selector adapted to reject a smooth-face slug, a slug having imitation faces of the proper predetermined coin which do not fit the configuration of said die means, and a slug having an opening in the same.

5. A coin selector including means for holding a predetermined coin in selecting position, coin-engaging die means having a configuration to fit the face of the predetermined coin, means for adjusting said die means to the face of the coin to fit the same, and vacuum means cooperating with said die means for drawing the coin into selected position, said coin selector acting to reject a slug or an imitation coin which does not fit said die means.

6. A coin selector and slug rejecter including die means having a configuration conforming to the surface of a predetermined coin for testing the face of such coin by engagement therewith, means for selecting and retaining the coin if it fits the configuration of said die means, and means for rejecting any imitation coin to discard the same by its failure to correspond with the configuration of said die means.

7. A coin selector and slug rejecter including means for holding a coin or slug in selecting position, coin selector means adapted to be brought in contact with the faces of the coin or slug and having means engageable with and operable over the entire surface of one face of a genuine coin, whereby such genuine coin is selected and retained in said selector, and means for actuating said holding means for rejecting a slug detected by said selector means by reason of the fact that such slug does not have a surface conforming to the surface of a genuine coin.

8. A coin selector for a predetermined coin and a slug rejecter comprising testing means for engaging the face of a deposited coin or slug, and vacuum means cooperating with said testing means to select a genuine coin to cause the same to be retained in said selector, said vacuum means being ineffective on a slug or imitation coin not having a face conforming to the face of a genuine coin.

9. A coin selector and slug rejecter comprising means for receiving and holding a coin or slug in position to be selected or rejected, a source of vacuum, vacuum means connected with said source and adapted to engage the surface of the coin or slug, and means including said vacuum means for selecting or rejecting the coin or slug dependent on whether the same has the surface of a coin or an irregular surface not identical with the surface of a coin.

10. A coin selector and slug rejecter including an adjustable selecting means having a die on the face thereof adapted to fit a coin of predetermined denomination, and vacuum means adapted to cooperate with said selecting means to select such coin by contact between the coin and said die and to reject a slug, said vacuum means being ineffective on a slug due to its failure to fit said die.

11. A coin selector including means for receiving and supporting a coin or slug in selecting position, a pair of coin engaging members each having a die face formed therein adapted to fit the face of the coin to be selected, means for causing said members to engage a coin or slug in selecting position, vacuum means operable with said pair of members and effective upon either of said die faces fitting a similar face on a coin to select such coin and draw it by vacuum out of selecting position, and means for releasing said supporting means to reject a slug or false coin which is unselectable due to a non-fitting engagement with either of said die faces.

12. A coin selector and slug rejecter comprising means for receiving and holding a predetermined coin or slug, selector dies, means for moving said selector dies into contact with the faces of a received coin or slug, vacuum means for rendering either of said selector dies with which a received coin fits operative to select the same by causing the coin to adhere to the die, and means for releasing said holding means to reject a received slug or coin incapable of fitting one of said selector dies.

13. A coin selector and slug rejecter including a pair of vacuum selector die heads, means for bringing said die heads against the opposite faces, respectively, of a coin to be selected, means for adjusting said die heads relative to said coin, means for creating a vacuum in said die heads when one of them has been adjusted to a selecting position, whereby the coin is caused to adhere to the adjusted die head, and means for rejecting a slug or a false coin which fails to be picked up by the vacuum in either of said die heads.

14. A coin selector and slug rejecter including means for supporting a coin in selecting position, vacuum selector means having die heads for engaging the faces of the coin, means for creating a vacuum in said die heads to render said selector means operative to select the coin if it is of the proper denomination and surface configuration, and means for releasing said supporting means to reject a false coin which does not have the surface configuration required to fit the die heads in said selector means.

15. A slug rejecter including means for receiving and supporting a coin or slug, means for testing the face configuration of the coin or slug, and means for rejecting the same if found to be a slug and for retaining it if found to be a coin, said last means including means for moving said supporting means out of operating position, and said testing means including vacuum means.

16. In combination, a coin slot for receiving a coin of predetermined denomination, means for supporting a coin deposited in said slot, means for engaging the face of the coin to test the configuration thereof to determine if the coin is genuine, and means for applying suction to the coin through said engaging means, whereby if the coin is genuine it will be selected and retained while if false it will be rejected when said supporting means is withdrawn, and means for withdrawing said supporting means.

17. In a coin selector and slug rejecter, means for receiving a predetermined coin, a die containing an impression of said coin, means for moving said die against the coin, means for producing relative rotation between the die and coin to cause the coin to enter the impression in the die, means for withdrawing said die, and means for producing a partial vacuum in the die which causes the coin to adhere thereto when the die is withdrawn.

18. In a coin selector and slug rejecter, means for receiving a token which may be either a coin or a slug, a die having a face configuration adapted to fit the coin but not the slug, said die having a perforation therein, means for reciprocating the die to bring it momentarily against the received token, means for producing relative rotation between the die and token while the same are engaged, and means for exhausting air through the perforation in the die, whereby if the token enters the die during said rotation, as in the case where the token is a coin, a partial vacuum is established on the side of the coin next to the die and the coin is caused to adhere to the die.

19. In a coin selector and slug rejecter, means for receiving a token which may be a predetermined coin or a slug, a support for said token, a selector head having a face configuration adapted to fit one side of said coin, said selector head having an opening therein, means for moving said selector head against the token and for returning it, means for rotating said selector head while in engagement with said token to bring about a fit between the selector head and token if the latter is a coin, means for withdrawing said support, and means effective only if a fit is established for causing said token to adhere to said selector head after the support is withdrawn and while the selector head is being returned, said last means including a device for exhausting air through said opening.

20. In a coin selector and slug rejecter, means for receiving a predetermined coin, a pair of dies located on opposite sides of the coin in received position, said dies having face configurations adapted to fit one side of said coin, means for bringing said dies into engagement with opposite sides of said coin, respectively, and for withdrawing them, means for rotating said dies while in engagement with the coin to enable the coin to enter one of the dies, and means for producing a partial vacuum in the die entered by the coin which causes the coin to adhere to the die when the same is withdrawn.

21. In a coin selector, means for receiving a predetermined coin, a selector head mounted on a hollow shaft and having a face configuration adapted to fit said coin, said selector head having an opening therein to establish communication between its face and the interior of said shaft, means for moving said shaft longitudinally to bring the face of the selector head momentarily against the side of the received coin and for then returning the shaft and selector head, means for rotating said shaft while the selector head is in engagement with the coin to properly orient the selector head with the coin, and means for exhausting air from said hollow shaft to produce a partial vacuum between the selector head and coin, whereby the coin is caused to adhere to the selector head when it is returned.

HAROLD A. SMITH.